(12) United States Patent
Rollinger et al.

(10) Patent No.: US 10,060,366 B1
(45) Date of Patent: Aug. 28, 2018

(54) TRANSIENT POWER CONTROL METHOD FOR AN ENGINE THAT INCLUDES A COMPRESSOR

(71) Applicant: Ford Global Technologies, LLC, Dearborn, MI (US)

(72) Inventors: John Eric Rollinger, Troy, MI (US); Tyler Kelly, Plymouth, MI (US); Patrick Matthews, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/612,428

(22) Filed: Jun. 2, 2017

(51) Int. Cl.
*F02D 41/08* (2006.01)
*F02D 41/00* (2006.01)
*F02D 41/26* (2006.01)

(52) U.S. Cl.
CPC ......... *F02D 41/0007* (2013.01); *F02D 41/08* (2013.01); *F02D 41/26* (2013.01); *F02D 2200/602* (2013.01)

(58) Field of Classification Search
CPC ...... F02D 41/0007; F02D 41/08; F02D 41/26; F02D 11/105; F02D 11/106; F02D 2200/602; F02D 2250/18
USPC ......... 123/339.1, 559.1, 436, 562, 564, 565; 701/110; 60/612
See application file for complete search history.

(56) References Cited

U.S. PATENT DOCUMENTS

| | | | |
|---|---|---|---|
| 6,684,863 B2 * | 2/2004 | Dixon | F02B 39/10 123/559.1 |
| 9,267,442 B2 * | 2/2016 | Denholm | F02C 9/00 |
| 9,540,989 B2 | 1/2017 | Sanchez Perez et al. | |
| 2015/0313960 A1 | 11/2015 | Peoples et al. | |
| 2016/0131050 A1 | 5/2016 | Wu et al. | |
| 2017/0218834 A1 * | 8/2017 | Kemmerling | F02B 29/0412 |

* cited by examiner

*Primary Examiner* — Hai Huynh
(74) *Attorney, Agent, or Firm* — Julia Voutyras; McCoy Russell LLP

(57) ABSTRACT

Systems and methods for operating an engine that includes an electrically driven compressor are disclosed. In one example, a vehicle operating mode is determined and speed of an electrically driven compressor is adjusted responsive to the vehicle operating mode so that an engine may supply torque sooner in response to an increasing torque command.

20 Claims, 6 Drawing Sheets

TRANSIENT POWER CONTROL METHOD FOR AN ENGINE THAT INCLUDES A COMPRESSOR

FIELD

The present description relates to systems and method for providing compensation for transient engine power requests or commands. The system and methods may be suitable for engines that include a compressor to pressurize air that enters the engine.

BACKGROUND AND SUMMARY

An engine may include a compressor to increase engine power. The compressor may be part of a turbocharger or a super charger. At low engine loads, the compressor may rotate at low engine speeds and provide little boost. As engine load increases, compressor speed may increase to provide increased boost to the engine. However, since the compressor has inertia, it may take longer than is desired for the compressor to reach a speed where it provides a desired level of boost. The delay period between when increased engine power is commanded and when boost pressure reaches a value to meet the increased engine power may be referred to as compressor lag.

One way to reduce compressor lag from a turbocharger or super charger is to install an electrically driven compressor in series with the supercharger or turbocharger. The electrically driven compressor may reduce compressor lag time because the electrically driven compressor may have a shorter response time. Nevertheless, the electrically driven compressor also has to overcome inertia of its compressor and rotating components to meet a desired boost pressure. At least one set of driving conditions expose limitations of an electrically driven compressor. Specifically, during conditions where durations between requested power being high and requested power being low are short, the electric compressor may not be able to accelerate the compressor from a low speed to a higher speed to meet boost requirements. Therefore, a driver of the vehicle may experience some delay in the production of engine power. For example, during a rock crawl mode or traveling off road, a vehicle driver may make short requests for large amounts of engine power to move over rocks in the vehicle's path. As soon as the rock or obstacle is overcome, the vehicle driver may reduce the engine torque demand so that vehicle body motion and vehicle acceleration may be controlled. The vehicle driver may have to overcome several obstacles that are closely spaced resulting in a series of large engine torque demands that are each followed by large engine torque reduction. During such conditions, the electrically driven compressor may not deliver boost as fast as is desired so that the driver may notice some hesitation by the engine to provide the requested torque. Therefore, it would be desirable to provide a timely way of meeting the driver demanded torque when time between large torque demands and small torque demands is short.

The inventors herein have recognized the above-mentioned issues and have developed an engine operating method, comprising: in a first mode, rotating an electrically driven compressor at a base speed while an engine rotates at idle speed and driver demand torque is zero; and in a second mode, rotating the electrically driven compressor at the base speed plus an offset speed while the engine rotates at idle speed and driver demand torque is zero.

By rotating an electrically driven compressor at a base speed plus an offset speed, pressurized air may be made available to the engine even during conditions where a vehicle driver increases and decreases a driver demand torque in a short period of time. The speed offset increases boost pressure so that if the vehicle driver requests torque quickly after releasing the accelerator pedal, a large amount of air may be made available to the engine so that engine torque may be quickly increased.

In other examples, a decreasing electric compressor speed command or request may be low pass filtered so that it takes an increased amount of time for speed of the electric compressor to reach base compressor speed for engine idle conditions. Thus, it may take longer for the compressor speed to be reduced from a higher speed to base speed so that if the driver requests additional torque in a short period of time, electric compressor speed is at a higher level than base electric compressor speed. In this way, additional air may be provided to the engine as compared to if the electric compressor speed was quickly reduced to base speed after a driver released the accelerator pedal.

The present description may provide several advantages. In particular, the approach may provide a higher level of boost at engine idle conditions as compared to if the electric compressor rotated at a speed for base engine idle conditions. Further, the approach may reduce an amount of time for an engine to provide a desired amount of torque. Further still, the approach may be incorporated into a transient power performance mode that may be entered automatically or via human driver input.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
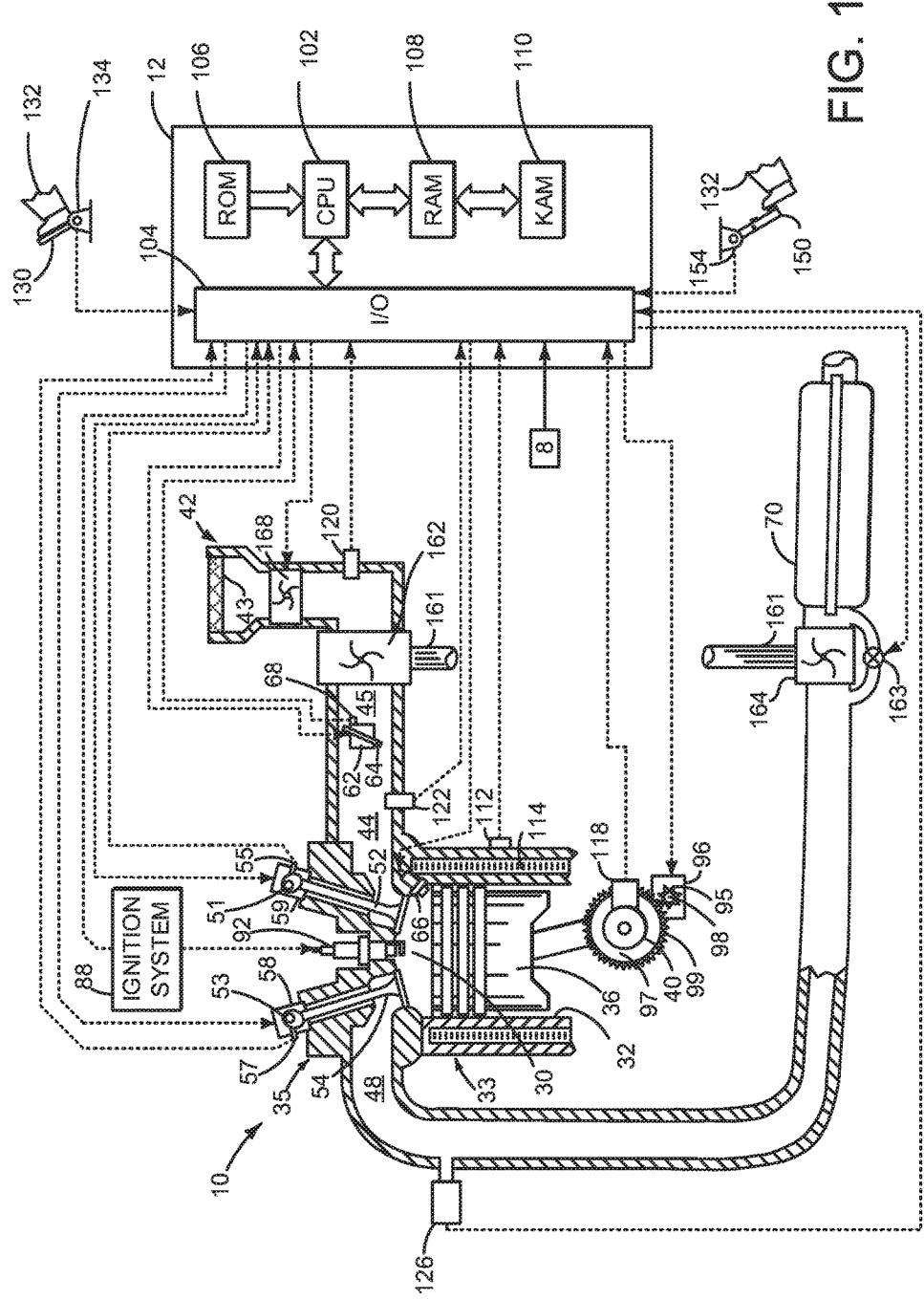
FIG. 1 is a schematic diagram of an engine.
Figure 2:
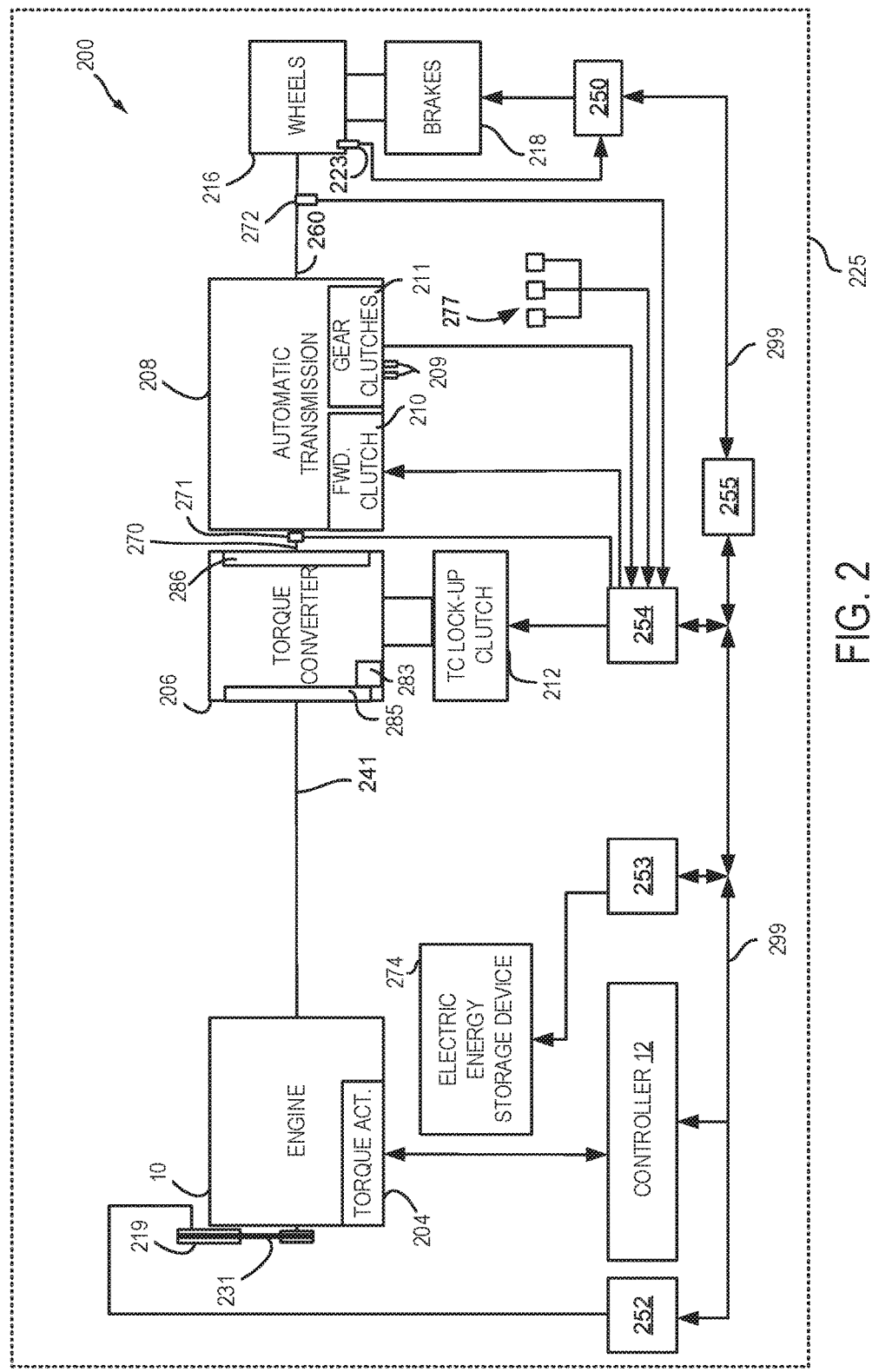
FIG. 2 is a schematic diagram of a vehicle driveline including an alternator.

The present description is related to controlling an engine and an electrically driven compressor that supplies air to the engine. The internal combustion engine may be configured as shown in FIG. 1. The internal combustion engine may be included in a driveline or powertrain of a vehicle as shown in FIG. 2. The engine and electrically driven compressor may operate according to the sequences shown in FIGS. 3 and 4. The internal combustion engine and electrically driven compressor may be operated via a controller that includes executable instructions to perform the method of FIGS. 5 and 6.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A vehicle and/or engine operating mode may be selected via a human driver via human/machine interface 8. Human/machine interface may be comprised of a switch, touch screen, or other input device.

Controller 12 is shown in FIG. 1 as a conventional microcomputer including: microprocessor unit 102, input/output ports 104, read-only memory 106 (e.g., non-transitory memory), random access memory 108 (e.g., transitory memory), keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10. Engine 10 may be started with an engine starting system shown in FIG. 1. Further, torque of engine 10 may be adjusted via torque actuator 204, such as a fuel injector, throttle, etc. Engine 10 may also supply electrical power to vehicle 225 via alternator 219, which is shown mechanically coupled to engine 10 via belt 231. Alternator 219 may be coupled to crankshaft 40 or a camshaft (e.g., 51 or 53). Alternator 219 may supply electrical power to low voltage (e.g., 12 VDC) electric energy storage device 274.

An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed.

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from alternator 219 by adjusting current flowing to and from field and/or armature windings of alternator 219 as is known in the art. Electrical output from alternator 219 may be provided in a stationary mode where the transmission is in park or neutral. Alternatively, electrical output from the alternator 219 may be provided in a non-stationary mode where the vehicle is traveling on a road.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), alternator temperature sensors, and BISG temperature sensors, and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine including a compressor and an electrically driven compressor; an accelerator pedal; and a controller including executable instructions stored in non-transitory memory to maintain a constant engine air flow at engine idle speed for different electrically driven compressor speeds that are responsive to different engine operating modes. The system includes where adjusting speed of the electrically driven compressor responsive to engine operating mode includes adjusting speed of the electrically driven compressor to a first speed in response to the engine operating mode not being a transient power performance mode. The system includes where adjusting speed of the electrically driven compressor responsive to engine operating mode includes adjusting speed of the electrically driven compressor to a second speed in response to the engine operating mode being a transient power performance mode. The system further comprises additional instructions to determine the engine operating mode responsive to accelerator pedal position changes. The system further comprises additional instructions to determine the engine operating mode responsive to a driver input device.

Figure 3:
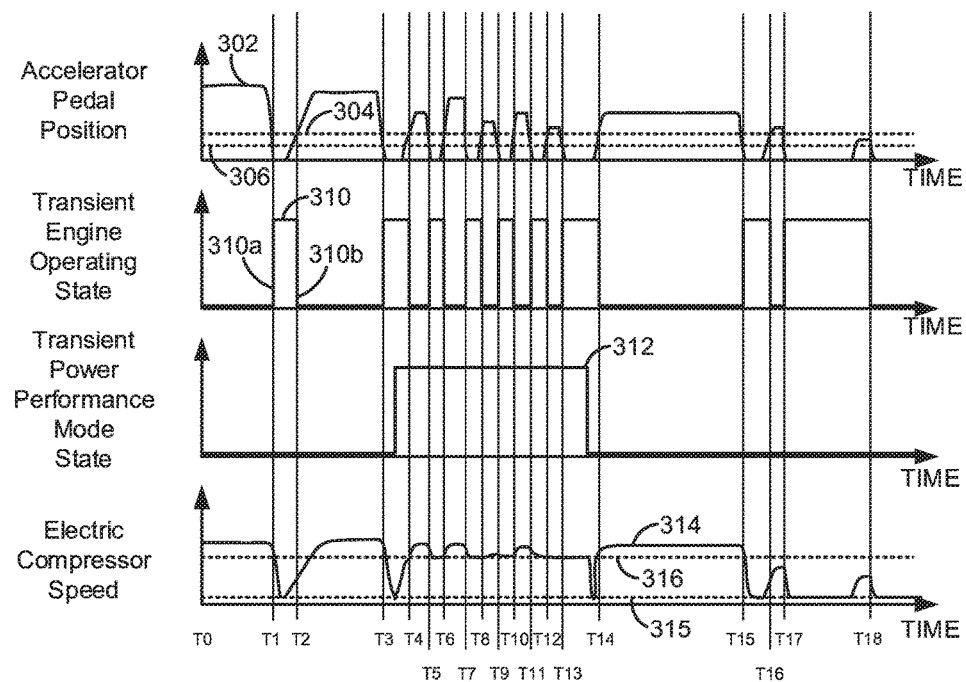
FIGS. 3 and 4 show example vehicle operating sequences according to the method of FIG. 5.

Referring now to FIG. 3, an example vehicle operating sequence is shown. The sequence of FIG. 3 may be provided according to the method of FIGS. 5 and 6 in conjunction with the system of FIGS. 1 and 2. The plots shown in FIG. 3 occur at the same time and are aligned in time. The vertical lines at times T0-T18 represent times of interest in the sequence. In this sequence, transient mode electrical compressor compensation is provided when transient mode compensation is request via a human/machine interface.

The first plot from the top of FIG. 3 is a plot of accelerator pedal position versus time. The vertical axis represents accelerator pedal position and accelerator pedal position increases in the direction of the vertical axis arrow. Accelerator pedal position is zero or not applied at the level of the horizontal axis. The horizontal axis represents time and time increases from the left side of the figure to the right side of the figure. In some examples, driver demand torque may be determined as a function of accelerator pedal position and vehicle speed. When the accelerator is not applied (e.g., trace is at the level of the horizontal axis), driver demand torque is zero. Horizontal line 304 represents a first threshold. When the trace 302 changes from a level below horizontal line 304 to a level that is above or greater than horizontal line 304 while the transient state (e.g., trace 310) is at a higher level, the transient state changes state from a higher level to a lower level. Horizontal line 306 represents a second threshold. When the trace 302 changes from a level above horizontal line 306 to a level that is below or less than horizontal line 306 while the transient state (e.g., trace 310) is at a lower level, the transient state changes state from a lower level to a higher level.

The second plot from the top of FIG. 3 is a plot of transient engine operating state versus time. The vertical axis represents transient engine operating state. The transient engine operating state is at a low value near the horizontal axis. The transient engine operating state is at a high value near the vertical axis arrow. The transient engine operating state indicates that the engine accelerator pedal position has exceeded threshold 304 by transitioning from a higher level to a lower level when the accelerator pedal position is increasing and the transient state is at the higher level. The transient engine operating state indicates that the engine accelerator pedal position has decreased to a level less than threshold 306 by transitioning from a lower level to a higher level when the accelerator pedal position is decreasing and the transient state is at the lower level. Thus, the transient engine operating state provides a rising edge 310a in trace 310 in response to accelerator pedal position decreasing to a level less than threshold 306. The transient engine operating state also provides a falling edge 310b in response to accelerator pedal position increasing to a level greater than threshold 304. The horizontal axis represents time and time increases from the left side of the figure to the right side of the figure.

The third plot from the top of FIG. 3 is a plot of transient power performance mode state versus time. Transient electrical compressor compensation is provided when the transient power performance mode state is a high level near the vertical axis arrow. Transient mode electrical compressor compensation is not provided when the transient power performance mode state is at a lower level near the horizontal axis. A human operator of the vehicle may request transient mode electrical compressor compensation via providing input to controller 12 through a human/machine interface 8. A human is requesting transient mode electric compressor compensation when trace 312 is shown at a higher level. The horizontal axis represents time and time increases from the left side of the figure to the right side of the figure.

The fourth plot from the top of FIG. 3 is a plot electrically driven compressor speed versus time. The vertical axis represents electrically driven compressor speed and electrically driven compressor speed increases in the direction of the vertical axis arrow. The horizontal axis represents time and time increases from the left side of the figure to the right side of the figure. Horizontal line 315 is represents a base electrically driven compressor speed for when the engine is at idle speed, driver demand torque is zero, and transient power performance mode is not activated (e.g., when transient driver demand torque compensation is not provided by the electrically driven compressor). Horizontal line 316 is represents a base electrically driven compressor speed plus offset speed for when the engine is at idle speed, driver demand torque is zero, and transient power performance mode is activated (e.g., when transient driver demand torque compensation is provided by the electrically driven compressor).

Although not shown, engine speed reaches idle speed for at least a portion time between times T1 and T2, between times T3 and T4, between times T5 and T6, between times T7 and T8, between times T9 and T10, between times T11 and T12, between times T13 and T14, between times T15 and T16, and between times T17 and T18. However, it is not necessary for engine speed to reach idle speed to change transient engine operating state or transient power performance mode state. Further, the air flow though the engine when the engine is at engine idle speed is constant whether the transient power performance mode is level zero or one when accelerator pedal position or driver demand torque is zero.

At time T0, the accelerator pedal is applied by a human driver (not shown) at a middle level and the transient state is indicating that the accelerator pedal position is not increasing above threshold 304 or decreasing below threshold 306. The transient power performance mode state is at a lower level indicating that the vehicle's driver does not want to enable transient power performance state. The speed of the electrically driven compressor is at a middle level.

At time T1, the accelerator pedal is being released by a human driver (not shown) and its position has been reduced to a level below threshold 306. As a result, the transient state trace changes from a low level to a high level to indicate that accelerator pedal position or driver demand torque is decreasing and less than threshold 306. The transient power performance mode state is at a lower level indicating that transient power performance mode is not activated. Compressor speed is reduced in response to the reduction in accelerator pedal position and driver demand torque.

At time T2, the accelerator pedal is being applied by a human driver (not shown) and its position has increased to a level above threshold 304. The transient state trace changes from a higher level to a lower level to indicate that accelerator pedal position or driver demand torque is increasing and greater than threshold 304. The transient power performance mode state trace is at a lower level indicating that transient power performance mode is not activated. Compressor speed is increased in response to the increase in accelerator pedal position and driver demand torque.

At time T3, the accelerator pedal is once again being released by a human driver (not shown) and its position has been reduced to a level below threshold 306. Therefore, the transient state trace changes from a low level to a high level to indicate that accelerator pedal position or driver demand torque is decreasing and less than threshold 306. The transient power performance mode state trace is at a lower level indicating that transient power performance mode is not activated. Compressor speed is reduced in response to the reduction in accelerator pedal position and driver demand torque.

Between time T3 and time T4, the accelerator pedal position does not change nor does the transient state change. However, the transient power performance mode is activated by the vehicle's human driver (not shown) as indicated by the transient power performance mode state trace changing state from a lower level to a higher level. The electrically driven compressor speed is increased toward threshold speed 316 in response to activating the transient power performance mode.

At time T4, the vehicle's human driver (not shown) has increased the accelerator pedal position to threshold 304. The transient state trace 310 is reduced to a lower level in response to the change in accelerator pedal position and the vehicle remains in power performance mode as indicated by the power performance state trace 312 being at a higher level. The speed of the electrically driven compressor increases in response to the increase in accelerator pedal position and driver demand torque. Increasing speed of the electrically driven compressor may increase air flowing through the electrically driven compressor. If the accelerator pedal position and driver demand torque change result in a higher desired air flow through the electrically driven compressor than the base electrically driven compressor speed plus the power performance mode speed offset may provide, the electrically driven compressor speed may be increased further as shown to provide the desired air flow through the electrically driven compressor.

At time T5, the vehicle's human driver (not shown) has decreased the accelerator pedal position to less than threshold 306. The transient state trace 310 is changed to a higher level in response to the change in accelerator pedal position and the vehicle remains in power performance mode as indicated by the power performance state trace 312 being at a higher level. The speed of the electrically driven compressor is decreased to threshold 316 in response to the decrease in accelerator pedal position and driver demand torque. The electrically driven compressor speed is held at threshold 316 so that increased torque may be provided by the engine in response to an increase in accelerator pedal position and/or driver demand torque. Thus, by keeping speed of electrically driven compressor elevated above base speed 315, the engine's transient torque response may be improved.

Between time T5 and time T13, the human driver applies and releases the accelerator pedal to various levels while the vehicle remains in transient power performance mode. Consequently, the electrically driven compressor speed is maintained above threshold 316 and it is increased above threshold 316 when the accelerator pedal position and/or driver demand torque requests air flow through the electrically driven compressor above threshold 316. The transient state trace 310 changes from low to high and from high to low in response to the change in accelerator pedal position.

Between time T13 and time T14, the accelerator pedal position does not change nor does the transient state change. However, the transient power performance mode is deactivated by the vehicle's human driver (not shown) as indicated by the transient power performance mode state trace changing state from a higher level to a lower level. The electrically driven compressor speed is decreased toward threshold speed 315 in response to deactivating the transient power performance mode and the accelerator pedal position being zero.

Between time T14 and time T18, the human driver (not shown) applies and releases the accelerator pedal several times. Each time the accelerator pedal position exceeds threshold 304 after being less than threshold 304, the transient state changes. Further, each time the accelerator pedal position is less than threshold 306 after being above threshold 304, the transient state changes. Since the transient power performance mode is not activated as indicate by trace 312 being at a lower level, electric compressor speed is adjusted from base speed 315 up to higher levels to provide the desired driver demand torque.

In this way, electric compressor speed may be adjusted responsive to a human driver input to provide transient power performance that reduces the possibility of producing delayed torque via an engine related to accelerating inertia of the electrically driven compressor. Further, air flow through the engine (not shown) is made equivalent via adjusting engine throttle position for conditions when engine speed is at idle speed and driver demand torque is zero whether the transient power performance is activated or not activated.

Figure 4:
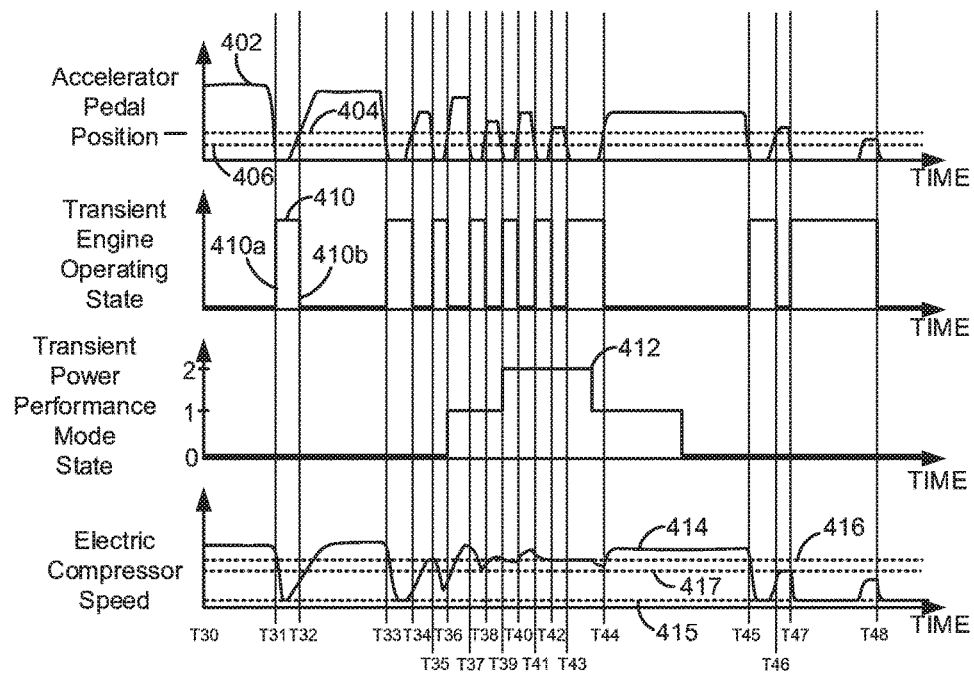

Referring now to FIG. 4, an example vehicle operating sequence is shown. The sequence of FIG. 4 may be provided according to the method of FIGS. 5 and 6 in conjunction with the system of FIGS. 1 and 2. The plots shown in FIG. 4 occur at the same time and are aligned in time. The vertical lines at times T30-T48 represent times of interest in the sequence. In this sequence, transient mode electrical compressor compensation is automatically determined responsive to accelerator pedal input.

The first plot from the top of FIG. 4 is a plot of accelerator pedal position versus time. The vertical axis represents accelerator pedal position and accelerator pedal position increases in the direction of the vertical axis arrow. Accelerator pedal position is zero or not applied at the level of the horizontal axis. The horizontal axis represents time and time increases from the left side of the figure to the right side of the figure. In some examples, driver demand torque may be determined as a function of accelerator pedal position and vehicle speed. When the accelerator is not applied (e.g., trace is at the level of the horizontal axis), driver demand torque is zero. Horizontal line 404 represents a first threshold. When the trace 402 changes from a level below horizontal line 404 to a level that is above or greater than horizontal line 404 while the transient state (e.g., trace 410) is at a higher level, the transient state changes state from a higher level to a lower level. Horizontal line 406 represents a second threshold. When the trace 402 changes from a level above horizontal line 406 to a level that is below or less than horizontal line 406 while the transient state (e.g., trace 410) is at a lower level, the transient state changes state from a lower level to a higher level.

The second plot from the top of FIG. 4 is a plot of transient engine operating state versus time. The vertical axis represents transient engine operating state. The transient engine operating state is at a low value near the horizontal axis. The transient engine operating state is at a high value near the vertical axis arrow. The transient engine operating state indicates that the engine accelerator pedal position has exceeded threshold 404 by transitioning from a higher level to a lower level when the accelerator pedal position is increasing and the transient state is at the higher level. The transient engine operating state indicates that the engine accelerator pedal position has decreased to a level less than threshold 406 by transitioning from a lower level to a higher level when the accelerator pedal position is decreasing and the transient state is at the lower level. Thus, the transient engine operating state provides a rising edge 410a in trace 410 in response to accelerator pedal position decreasing to a level less than threshold 406. The transient engine operating state also provides a falling edge 410b in response to accelerator pedal position increasing to a level greater than threshold 404. The horizontal axis represents time and time increases from the left side of the figure to the right side of the figure.

The third plot from the top of FIG. 4 is a plot of transient power performance mode state versus time. The level of transient power performance mode state is posted along the vertical axis. Transient electrical compressor compensation is provided when the transient power performance mode state is at level one or two. No transient electrical compressor compensation is provided at level zero. Level zero may be referred to as a non-transient power performance mode. Further, at level zero, a decrease in the electrically driven compressor speed request may be filtered with a low pass filter and a short time constant before the electrically driven compressor is commanded to the filtered speed. In one example, a first speed offset is added to a base electrically driven compressor speed to provide a first minimum compressor speed when transient electric compressor compensation is provided at level one. A second speed offset is added to a base electrically driven compressor speed to provide a second minimum compressor speed when transient electric compressor compensation is provided at level two. The level (e.g., zero, one, or two) is automatically selected via the controller as discussed in the method of FIGS. 5 and 6 responsive to accelerator pedal position. The horizontal axis represents time and time increases from the left side of the figure to the right side of the figure.

The fourth plot from the top of FIG. 4 is a plot electrically driven compressor speed versus time. The vertical axis represents electrically driven compressor speed and electrically driven compressor speed increases in the direction of the vertical axis arrow. The horizontal axis represents time and time increases from the left side of the figure to the right side of the figure. Horizontal line 415 is represents a base electrically driven compressor speed for when the engine is at idle speed, driver demand torque is zero, and transient power performance mode is not activated (e.g., when transient driver demand torque compensation is not provided by the electrically driven compressor). Horizontal line 416 is represents a base electrically driven compressor speed plus a second offset speed for when the engine is at idle speed, driver demand torque is zero, and transient power performance mode is activated at the second level (e.g., when transient driver demand torque compensation is provided by the electrically driven compressor). Horizontal line 417 is represents a base electrically driven compressor speed plus a first offset speed for when the engine is at idle speed, driver demand torque is zero, and transient power performance mode is activated at the first level (e.g., when transient driver demand torque compensation is provided by the electrically driven compressor).

Although not shown, engine speed reaches idle speed for at least a portion of the time between times T31 and T32, between times T33 and T34, between times T35 and T36, between times T37 and T38, between times T39 and T40, between times T41 and T42, between times T43 and T44, between times T45 and T46, and between times T47 and T48. However, it is not necessary for engine speed to reach idle speed to change transient engine operating state or transient power performance mode state. Further, the air flow though the engine when the engine is at engine idle speed is constant whether the transient power performance mode is level zero, one, or two when accelerator pedal position or driver demand torque is zero.

At time T30, the accelerator pedal is applied by a human driver (not shown) at a middle level and the transient state is indicating that the accelerator pedal position is not increasing above threshold 304 or decreasing below threshold 306. The transient power performance mode state is at a lower level indicating that the vehicle's driver does not want to enable transient power performance state. The speed of the electrically driven compressor is at a middle level.

At time T31, the accelerator pedal is being released by a human driver (not shown) and its position has been reduced to a level below threshold 306. As a result, the transient state trace changes from a low level to a high level to indicate that accelerator pedal position or driver demand torque is decreasing and less than threshold 406. The transient power performance mode state is at a lower level indicating that transient power performance mode is not activated. Compressor speed is reduced in response to the reduction in accelerator pedal position and driver demand torque.

At time T32, the accelerator pedal is being applied by a human driver (not shown) and its position has increased to a level above threshold 404. The transient state trace changes from a higher level to a lower level to indicate that accelerator pedal position or driver demand torque is increasing and greater than threshold 404. The transient power performance mode state trace is at a lower level indicating that transient power performance mode is not activated. Compressor speed is increased in response to the increase in accelerator pedal position and driver demand torque.

At time T33, the accelerator pedal is once again being released by a human driver (not shown) and its position has been reduced to a level below threshold 406. Therefore, the transient state trace changes from a low level to a high level to indicate that accelerator pedal position or driver demand torque is decreasing and less than threshold 406. The transient power performance mode state trace is at a lower level indicating that transient power performance mode is not activated. Compressor speed is reduced in response to the reduction in accelerator pedal position and driver demand torque.

Between time T33 and time T36, the accelerator pedal position increases and decreases so that the transient engine operating state trace 410 changes state three times. The amount of time between each change in state of the engine operating state is less than a threshold so the transient compensation mode state is adjusted to level one from level zero, thereby activating transient power performance compensation. In one example, a first electrically driven compressor speed offset is added to a base electrically driven compressor speed which is commanded when the engine is at idle speed and accelerator pedal position and/or driver demand torque is zero. Alternatively, in another example, the electrically driven compressor speed is filtered via a first low pass digital filter when the electrically driven compressor speed being commanded is decreasing. The electrically driven compressor speed is not filtered when the electrically driven compressor speed being commanded is increasing. The first order low pass digital filter may be expressed as:

$$y(k)=\alpha x(k)+(1-\alpha)y(k-1)$$

where y is the output (e.g., filtered commanded electrically driven compressor speed), a is a filter smoothing factor that may be related to a filter time constant, k is the sample number, and x is the input (e.g., commanded decreasing electrically driven compressor speed). By filtering the commanded decreasing electrically driven compressor speed, the rate of reduction of the electrically driven compressor may be reduced so that the electrically driven compressor speed remains at a higher value for a longer amount of time after the accelerator pedal is released. Thus, for accelerator pedal transient events that are closely spaced in time, the electrically driven compressor speed may stay at a higher level so that engine torque may be produced faster than if the compressor speed was to fall to a lower speed.

While operating in at the first level transient power performance mode, the electrically driven compressor speed may be held at threshold speed 417 when the engine is at idle speed and driver demand is zero. Alternatively, the rate at which speed of the electrically driven compressor is reduced may be lowered via a first time constant or smoothing factor so that speed of the electrically driven compressor may remain higher for a longer period of time as compared to if the speed command of the electrically driven compressor was not filtered. By keeping speed of the electrically driven compressor elevated, the response time of the engine to produce torque may be reduced.

Between time T36 and time T39, the accelerator pedal position increases and decreases so that the transient engine operating state trace 410 changes state another three times. The amount of time between each change in state of the engine operating state is less than a threshold so the transient power performance mode state is adjusted to level two from level one. In one example, a second electrically driven compressor speed offset is added to a base electrically driven compressor speed which is commanded when the engine is at idle speed and accelerator pedal position and/or driver demand torque is zero. The second offset speed greater than the first offset speed. Alternatively, in another example, the electrically driven compressor speed is filtered via a second low pass digital filter when the electrically driven compressor speed being commanded is decreasing. The electrically driven compressor speed is not filtered when the electrically driven compressor speed being commanded is increasing. The second order low pass digital filter includes a smoothing factor that is different from the smoothing factor for the first low pass filter. The first smoothing factor provides a first time constant for the first low pass filter and the second smoothing factor provides a second time constant for the second low pass filter, the second time constant longer than the first time constant. Thus, the second low pass filter reduces a rate of change in the filtered electrically driven compressor command as compared to the first low pass filter.

In total, three transient events with time between each transient event being less than a threshold were required to enter level one of the transient power performance mode. Further, six transient events with time between each of the transient event being less than the threshold were required to enter level two of the transient power performance mode. The vehicle enters the second level of transient power performance mode at time T39. It should be appreciated that the number of transient events to enter the level one and level two may be adjusted as desired and that the example is not limited to the values of three and six.

While operating in at the second level transient power performance mode, the electrically driven compressor speed may be held at threshold speed 416 when the engine is at idle speed and driver demand is zero. Thus, when operating in mode two electrically driven compressor speed is always at or above level 416. Alternatively, the rate at which speed of the electrically driven compressor is reduced may be lowered via a second time constant or smoothing factor so that speed of the electrically driven compressor may remain higher for a longer period of time as compared to if the speed command of the electrically driven compressor was filtered using the low pass filter applied in the first level of transient power performance mode. By keeping speed of the electrically driven compressor elevated, the response time of the engine to produce larger amounts of torque as compared to in level one may be reduced.

Between time T39 and time T43, the amount of time between transient events (e.g., time between rising and falling edges of transient engine operating state) remains less than a threshold so that the transient power performance mode remains at the second level. The electric compressor speed is maintained at or above threshold 416. The electric compressor speed increases above threshold speed 416 when the accelerator pedal position or driver demand torque results in a request for electric compressor speeds above threshold 416 to provide a desired engine air flow.

Between time T43 and time T44, the amount of time between transient events increases to be greater than the threshold so the transient power performance mode is reduced to level one. The electrically driven compressor speed is reduced to less than threshold 416 shortly before time T44, but then electrically driven compressor speed is increased in response to the increasing accelerator pedal position.

Between time T44 and time T45, the amount of time between transient events increases to be greater than the threshold so the transient power performance mode is reduced to level zero. However, the electrically driven compressor speed is maintained at a higher level responsive to accelerator pedal position.

At time T45 the accelerator pedal position is less than threshold 406 so the electric compressor speed is reduced to threshold speed 415. By reducing compressor speed, compressor efficiency may be increased. The transient engine operating state also changes from a low level to a high level.

Between time T45 and T48, the accelerator pedal position increases and decreases several times, but the amount of time between the increases and decreases is greater than a threshold so the vehicle remains in transient power performance state level zero. The electric compressor speed is increased and decreased responsive to accelerator pedal position and/or driver demand torque.

In this way, electric compressor speed may be adjusted automatically responsive to accelerator pedal position or driver demand torque so that transient power performance may be improved. As such, the possibility of producing delayed torque via an engine related to accelerating inertia of the electrically driven compressor may be reduced. Further, air flow through the engine (not shown) is made equivalent via adjusting engine throttle position for conditions when engine speed is at idle speed and driver demand torque is zero whether the transient power performance is activated or not activated.

Figure 5:
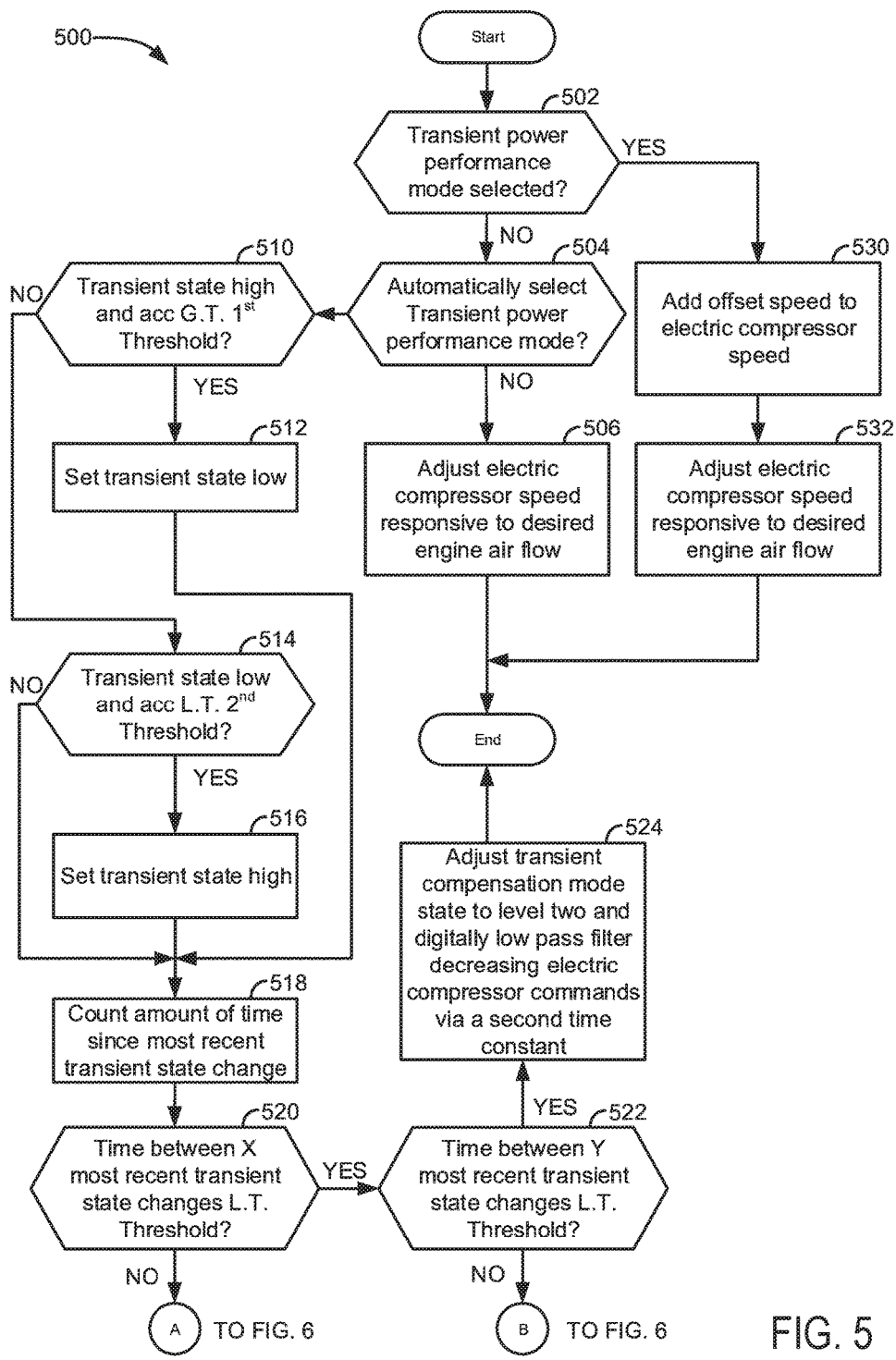
FIGS. 5 and 6 show an example method for operating an engine and electrically driven compressor.
Figure 6:
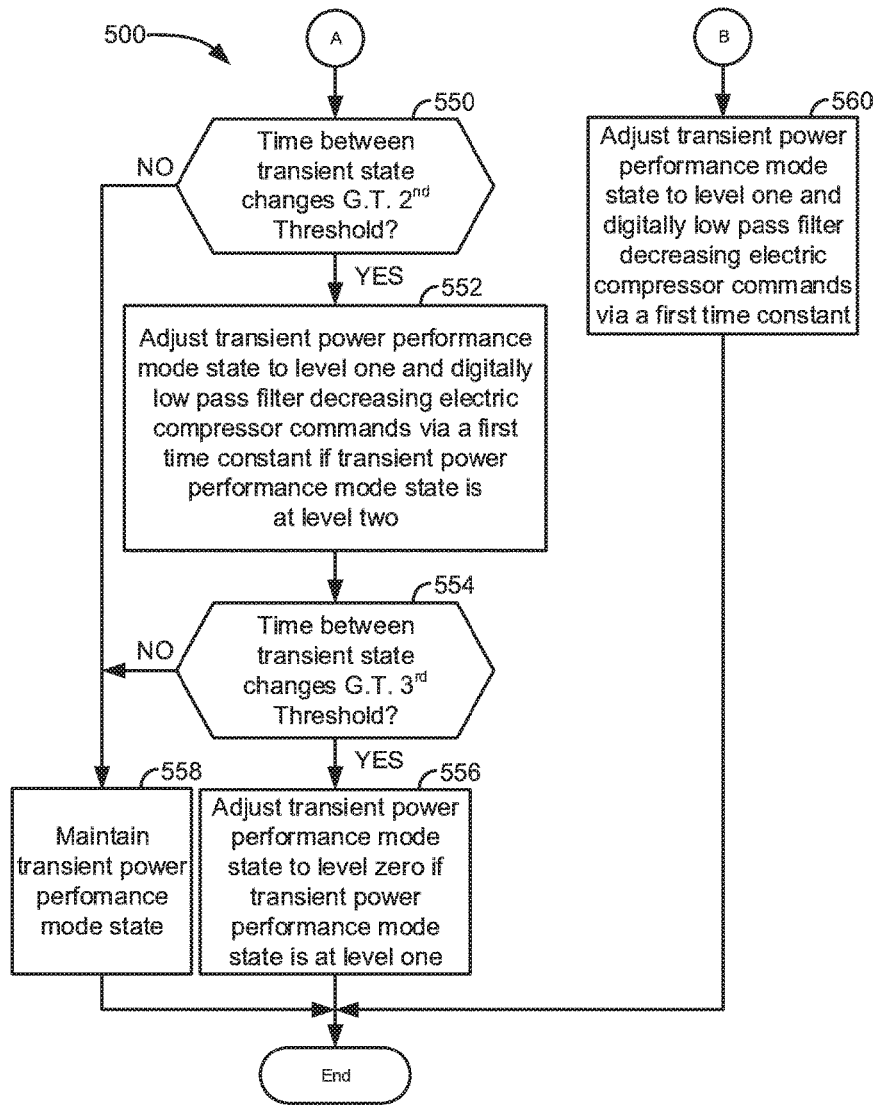

Referring now to FIGS. 5 and 6, a method for operating a vehicle is shown. At least portions of method 500 may be implemented as executable controller instructions stored in non-transitory memory. Additionally, portions of method 500 may be actions taken in the physical world to transform an operating state of an actuator or device. The method of FIGS. 5 and 6 may be incorporated into the system of FIGS. 1 and 2 as executable instructions stored in non-transitory memory.

At 502, method 500 judges if a human vehicle driver or passenger has selected transient power performance mode. Transient power performance mode may reduce the possibility of providing low or delayed engine torque during transient conditions where an accelerator pedal is applied and then released a short time later. In one example, method 500 may judge that transient power performance mode is selected when a human driver provides input to a human/machine interface. If method 500 judges that a human vehicle driver or passenger has selected transient power performance mode, the answer is yes and method 500 proceeds to 530. Otherwise, the answer is no and method 500 proceeds to 504.

At 530, method 500 adds an offset speed to a base electrically driven compressor speed so that the electrically driven compressor speed is at least the base electrically driven compressor speed plus the offset speed. By adding the offset speed to the base electrically driven compressor speed, the engine's torque response to an increase in accelerator pedal position may be improved. The base electrically driven compressor speed is a speed the electrically driven compressor rotates at when the engine is at idle speed, driver demand torque is zero, and transient power performance mode is not activated (e.g., a mode where electrically driven compressor speed is elevated to improve engine torque response). Method 500 proceeds to 532.

At 532, method 500 adjusts speed of the electrically driven compressor responsive to a desired air flow into the engine. The desired engine air flow is based on engine speed and driver demand torque or accelerator pedal position. In one example, a table or function that holds empirically determined desired engine air flow values is referenced or indexed using accelerator pedal position or driver demand torque and engine speed. The table outputs the desired engine air flow and the desired engine air flow references or indexes a table that outputs a desired electric compressor speed. The electrically driven compressor is commanded to the desired electric compressor speed. Further, if desired air flow is low, compressor speed is maintained at the base compressor speed plus the offset speed from 530. When the engine is at idle speed and zero driver demand torque, air flow through the engine is maintained at a same air flow as if the engine was operating at idle speed, zero demand torque, and a base electrically driven compressor speed. In one example, the engine throttle is closed further when the engine is at idle speed and zero driver demand torque in transient power performance mode as compared to when the engine is at idle speed and zero driver demand torque while not in transient power performance mode. Method 500 proceeds to exit.

In this way, method 500 may provide the operating sequence as shown in FIG. 3 to improve engine transient torque performance. The electric compressor speed may be elevated even when exhaust flow is low, which has advantages over exhaust driven compressors or engine driven compressors.

At 504, method 500 judges whether or not automatic selection of transient power performance mode is to be provided. In one example, a bit or byte in memory may represent a state of a variable that activates or deactivates automatic selection of transient power performance mode. If the value of the variable is one, the answer is yes and method 500 proceeds to 510. Otherwise, the answer is no and method 500 proceeds to 506. The state of the bit or byte in memory may be based on the vehicle configuration. For example, if the vehicle includes an electric compressor and is a truck, the value in the bit or byte may be one.

At 506, adjusts speed of the electrically driven compressor responsive to a desired air flow into the engine. The desired engine air flow is based on engine speed and driver demand torque or accelerator pedal position. In one example, a table or function that holds empirically determined desired engine air flow values is referenced or indexed using accelerator pedal position or driver demand torque and engine speed. The table outputs the desired engine air flow and the desired engine air flow references or indexes a table that outputs a desired electric compressor speed. The electrically driven compressor is commanded to the desired electric compressor speed. Further, if desired air flow is low, compressor speed is maintained at the base compressor speed plus the offset speed from 530. When the engine is at idle speed and zero driver demand torque, air flow through the engine is maintained at a same air flow as if the engine was operating at idle speed, zero demand torque, and a base electrically driven compressor speed. In one example, the engine throttle is closed further when the engine is at idle speed and zero driver demand torque in transient power performance mode as compared to when the engine is at idle speed and zero driver demand torque while not in transient power performance mode. Method 500 proceeds to exit.

At 510, method 500 judges if a transient state variable is high and accelerator pedal position is greater than (G.T.) a first threshold. The transient state variable provides an indication of when accelerator pedal position has increased from a low value to a value greater than a threshold (e.g., rising edge of signal) and an indication of when the accelerator pedal position has decreased from a higher value to a lower value less than a threshold (e.g., falling edge of the signal). An example of this condition is shown at time T2 of FIG. 3. If method 500 judges that the transient state variable is high and accelerator pedal position is greater than a first threshold, the answer is yes and method 500 proceeds to 512 where the transient state variable is adjusted to a low value. Otherwise, the answer is no and method 500 proceeds to 514.

At 514, method 500 judges if a transient state variable is low and accelerator pedal position is less than (L.T.) a second threshold. An example of this condition is shown at time T5 of FIG. 3. If method 500 judges that the transient state variable is low and accelerator pedal position is less than a second threshold, the answer is yes and method 500 proceeds to 516 where the transient state variable is adjusted to a high value. Otherwise, the answer is no and method 500 proceeds to 518. Thus, the state variable may remain unchanged if the conditions at 510 and 514 are not met.

At 518, method 500 counts or determines an amount of time between rising and falling edges of the transient state variable. Method 500 may determine an amount of time between rising and falling edges of a predetermined number of times the state variable changes state from high to low or low to high. The times may be stored into memory in a first-in first-out block of memory locations. Each time a new time between rising and falling edges is determined and stored to memory, an old time between rising and falling edges is removed from memory. In this way, method 500 may determine times between rising and falling edges of the transient state variable for a predetermined number of most recent transitions from low to high or high to low transient state variable transitions. Method 500 proceeds to 520.

At 520, method 500 judges if a time between a first predetermined number (X) of most recent transient state variable changes is less than a threshold. FIG. 4 shows an example where the predetermined number X is three between times T33 and T36. The times between the transient state variables are the time between T33 and T34, the time between T34 and T35, and the time T35 and T36. If method 500 judges that the time between the first predetermined number (X) of most recent transient state variable changes is less than a threshold, the answer is yes and method 500 proceeds to 522. This indicates that one or more short duration transient accelerator pedal manipulations that may be indicative of the vehicle rock crawling or performing another unique maneuver have been performed. Otherwise, the answer is no and method 500 proceeds to 550.

At 522, method 500 judges if a time between a second predetermined number (Y) of most recent transient state variable changes is less than a threshold. FIG. 4 shows an example where the predetermined number Y is six between times T33 and T39. The times between the transient state variables are the time between T33 and T34, the time between T34 and T35, the time T35 and T36, the time between T36 and T37, the time between time T37 and T38, the time between T38 and T39. If method 500 judges that the time between the second predetermined number (Y) of most recent transient state variable changes is less than a threshold, the answer is yes and method 500 proceeds to 524. This indicates that the vehicle may be performing a long duration vehicle rock crawling or other unique maneuver. Otherwise, the answer is no and method 500 proceeds to 560.

At 524, method 500 adjusts the transient power performance mode state to a second level. While the vehicle operates in the second transient power performance mode state, decreasing electrically driven compressor speed commands may be digitally filtered via a low pass filter with a second smoothing factor or time constant so that electrically driven compressor speed stays at higher speeds after being commanded to the higher speeds. Further, the digital low pass filter allows the electrically driven compressor speed to decay to base electrically driven compressor speed if the engine is operated at idle speed with zero torque demand for a predetermined amount of time. In other examples, a second offset speed may be added to a base electrically driven compressor speed so that electrically driven compressor speed is greater than the base compressor speed when the engine is at idle speed and the driver demand torque is zero. An example, of this mode of operation is shown in FIG. 4 between time T39 and time T43.

If the engine is operated at idle speed, zero driver demand torque, and the transient power performance state is at the second level, then air flow into the engine is equivalent to air flow into the engine when the engine is at engine idle speed, driver demand torque is zero, and the transient power performance state is at the zero level (e.g., not activated). The engine air flow is made equivalent even though boost pressure may be higher when the engine is operated at the second level by further closing the engine throttle. Method 500 proceeds to exit.

At 550, method 500 judges if a time between a second most recent transient variable state change and a most recent transient variable state change is greater than a second threshold. FIG. 4 shows an example where the time is greater than a threshold between time T43 and time T44 of FIG. 4. If method 500 judges that the time between a second most recent transient variable state change and a most recent transient variable state change is greater than a second threshold, the answer is yes and method 500 proceeds to 552. Otherwise, the answer is no and method 500 proceeds to 558.

At 558, method 500 maintains the present transient power performance mode state. The present transient mode state may be maintained to the zero, one, or second level. Method 500 proceeds to exit.

At 552, method 500 adjusts the transient power performance mode state to a first level if the transient power performance mode state is at the second level. The vehicle operates in the first transient power performance mode state as previously described. In this way, the transient power performance mode may be changed in response to a long duration between transient accelerator events (e.g., edges 410a and 410b as shown in FIG. 4) so that the transient power performance mode may reduce electrically driven compressor speed when transient increases in accelerator pedal position occur after extended periods of time. By reducing electrically driven compressor speed, efficiency of the electrically driven compressor may be improved.

At 554, method 500 judges if a time between a second most recent transient variable state change and a most recent transient variable state change is greater than a third threshold. FIG. 4 shows an example where the time is greater than a threshold between time T44 and time T45 of FIG. 4. If method 500 judges that the time between a second most recent transient variable state change and a most recent transient variable state change is greater than a third threshold, the answer is yes and method 500 proceeds to 556. Otherwise, the answer is no and method 500 proceeds to 558.

At 556, method 500 adjusts the transient power performance mode state to a zero level if the transient power performance mode state is at the first level. The vehicle operates in the zero transient power performance mode state as previously described (not activated). Thus, the transient power performance mode may be changed in response to a long duration between transient accelerator events so that the transient power performance mode may reduce electrically driven compressor speed when transient increases in accelerator pedal position occur after extended periods of time. By reducing electrically driven compressor speed, efficiency of the electrically driven compressor may be improved. Method 500 proceeds to exit.

At 560, method 500 adjusts the transient power performance mode state to a first level. While the vehicle operates in the first transient power performance mode state, decreasing electrically driven compressor speed commands may be digitally filtered via a low pass filter with a first smoothing factor or time constant so that electrically driven compressor speed stays at higher speeds after being commanded to the higher speeds. Further, the digital low pass filter allows the electrically driven compressor speed to decay to base electrically driven compressor speed if the engine is operated at idle speed with zero torque demand for a predetermined amount of time. In other examples, a first offset speed may be added to a base electrically driven compressor speed so that electrically driven compressor speed is greater than the base compressor speed when the engine is at idle speed and the driver demand torque is zero. An example, of this mode of operation is shown in FIG. 4 between time T36 and time T39.

If the engine is operated at idle speed, zero driver demand torque, and the transient power performance state is at the first level, then air flow into the engine is equivalent to air flow into the engine when the engine is at engine idle speed, driver demand torque is zero, and the transient power performance state is at the zero level (e.g., not activated). The engine air flow is made equivalent even though boost pressure may be higher when the engine is operated at the first level by further closing the engine throttle. Method 500 proceeds to exit.

Thus, the method of FIGS. 5 and 6 provides for an engine operating method, comprising: in a first mode, rotating an electrically driven compressor at a base speed while an engine rotates at idle speed and driver demand torque is zero; and in a second mode, rotating the electrically driven compressor at the base speed plus an offset speed while the engine rotates at idle speed and driver demand torque is zero. The method includes where the electrically driven compressor rotates at the base speed plus the offset speed for a predetermined amount of time since a most recent reduction in the driver demand torque. The method includes where the electrically driven compressor is placed in series with a non-electrically driven compressor. The method further comprises selecting the first mode or the second mode via an operator interface. The method further comprises selecting the first mode or the second mode in response to accelerator pedal position or driver demand torque. The method further comprises adjusting speed of the electrically driven compressor responsive to driver demand torque in response to driver demand torque being non-zero.

The method of FIGS. 4 and 5 also provides for an engine operating method, comprising: in a first mode, decreasing speed of an electric compressor responsive to output of a first low pass filter having a first time constant; and in a second mode, decreasing speed of the electric compressor responsive to output of a second low pass filter having a second time constant. The method includes where the first mode is a non-transient power performance mode and where the second mode is a transient power performance mode. The method further comprises selecting the first mode or the second mode in response to accelerator pedal position or driver demand torque. The method further comprises decreasing speed of the electric compressor responsive to output of a third low pass filter having a third time constant in response to a time between transient accelerator pedal events being less than a threshold for a threshold actual total number of accelerator pedal transient state change events. The method includes where the first time constant is less than the second time constant. The method includes where the first time constant and the second time constant are less than the third time constant. The method further comprises counting an amount of time between transient accelerator pedal events. The method includes where a transient accelerator pedal event includes an increasing accelerator pedal position that exceeds a threshold. The method includes where a transient accelerator pedal event includes a decreasing accelerator pedal position that is less than a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
in a first mode, rotating an electrically driven compressor at a base speed while an engine rotates at idle speed and driver demand torque is zero; and
in a second mode, rotating the electrically driven compressor at the base speed plus an offset speed while the engine rotates at idle speed and driver demand torque is zero.

2. The method of claim 1, where the electrically driven compressor rotates at the base speed plus the offset speed for a predetermined amount of time since a most recent reduction in the driver demand torque.

3. The method of claim 1, where the electrically driven compressor is placed in series with a non-electrically driven compressor.

4. The method of claim 1, further comprising selecting the first mode or the second mode via an operator interface.

5. The method of claim 1, further comprising selecting the first mode or the second mode in response to accelerator pedal position or driver demand torque.

6. The method of claim 1, further comprising adjusting speed of the electrically driven compressor responsive to driver demand torque in response to driver demand torque being non-zero.

7. An engine operating method, comprising:
in a first mode, decreasing speed of an electric compressor responsive to output of a first low pass filter having a first time constant; and
in a second mode, decreasing speed of the electric compressor responsive to output of a second low pass filter having a second time constant.

8. The method of claim 7, where the first mode is a non-transient power performance mode and where the second mode is a transient power performance mode.

9. The method of claim 7, further comprising selecting the first mode or the second mode in response to accelerator pedal position or driver demand torque.

10. The method of claim 9, further comprising decreasing speed of the electric compressor responsive to output of a third low pass filter having a third time constant in response to a time between transient accelerator pedal events being less than a first threshold for a second threshold actual total number of accelerator pedal transient state change events.

11. The method of claim 10, where the first time constant is less than the second time constant.

12. The method of claim 11, where the first time constant and the second time constant are less than the third time constant.

13. The method of claim 7, further comprising counting an amount of time between transient accelerator pedal events.

14. The method of claim 13, where a transient accelerator pedal event includes an increasing accelerator pedal position that exceeds a fourth threshold.

15. The method of claim 14, where a transient accelerator pedal event includes a decreasing accelerator pedal position that is less than a fifth threshold.

16. A system, comprising:
an engine including a compressor and an electrically driven compressor;
an accelerator pedal; and
a controller including executable instructions stored in non-transitory memory to maintain a constant engine air flow at engine idle speed for different electrically driven compressor speeds that are responsive to different engine operating modes.

17. The system of claim 16, where adjusting speed of the electrically driven compressor responsive to engine operating mode includes adjusting speed of the electrically driven compressor to a first speed in response to the engine operating mode not being a transient power performance mode.

18. The system of claim 17, where adjusting speed of the electrically driven compressor responsive to engine operating mode includes adjusting speed of the electrically driven compressor to a second speed in response to the engine operating mode being a transient power performance mode.

19. The system of claim 18, further comprising additional instructions to determine the engine operating mode responsive to accelerator pedal position changes.

20. The system of claim 19, further comprising additional instructions to determine the engine operating mode responsive to a driver input device.

* * * * *